(12) United States Patent
Kim

(10) Patent No.: US 10,759,961 B2
(45) Date of Patent: Sep. 1, 2020

(54) FLOOR COATING AGENT HAVING EXCELLENT SURFACE ADHESION AND HARDNESS, AND CONSTRUCTION METHOD USING THE SAME

(71) Applicant: ELLIM B.M.S CO., LTD., Seoul (KR)

(72) Inventor: Young Gu Kim, Namyangju-si (KR)

(73) Assignee: ELLIM B.M.S CO., LTD., Seoul (KR)

( * ) Notice: Subject to any disclaimer, the term of this patent is extended or adjusted under 35 U.S.C. 154(b) by 213 days.

(21) Appl. No.: 16/018,142

(22) Filed: Jun. 26, 2018

(65) Prior Publication Data

US 2019/0203069 A1  Jul. 4, 2019

(30) Foreign Application Priority Data

Dec. 29, 2017 (KR) ........................ 10-2017-0183733

(51) Int. Cl.

| | | |
|---|---|---|
| *C09D 163/00* | (2006.01) | |
| *C09D 133/06* | (2006.01) | |
| *C09D 7/48* | (2018.01) | |
| *C09D 7/61* | (2018.01) | |
| *B05D 3/00* | (2006.01) | |
| *C08K 3/04* | (2006.01) | |
| *C08K 3/22* | (2006.01) | |
| *C08K 5/092* | (2006.01) | |
| *C09D 5/00* | (2006.01) | |
| *C09D 7/65* | (2018.01) | |
| *C08G 59/62* | (2006.01) | |
| *C09D 7/63* | (2018.01) | |
| *C08G 59/42* | (2006.01) | |
| *C08G 59/32* | (2006.01) | |
| *C08G 59/38* | (2006.01) | |
| *C08K 5/3492* | (2006.01) | |
| *C08K 3/28* | (2006.01) | |
| *C08K 5/00* | (2006.01) | |
| *C08L 101/02* | (2006.01) | |

(52) U.S. Cl.
CPC ....... *C09D 163/00* (2013.01); *C08G 59/3245* (2013.01); *C08G 59/38* (2013.01); *C08G 59/42* (2013.01); *C08G 59/62* (2013.01); *C09D 5/002* (2013.01); *C09D 7/48* (2018.01); *C09D 7/61* (2018.01); *C09D 7/63* (2018.01); *C09D 7/65* (2018.01); *C09D 133/06* (2013.01); *C08K 3/22* (2013.01); *C08K 3/28* (2013.01); *C08K 5/0058* (2013.01); *C08K 5/092* (2013.01); *C08K 5/34924* (2013.01); *C08K 2003/2296* (2013.01); *C08L 101/02* (2013.01)

(58) Field of Classification Search
None
See application file for complete search history.

(56) References Cited

U.S. PATENT DOCUMENTS

| | | | | |
|---|---|---|---|---|
| 6,875,500 | B2 * | 4/2005 | McGrath, Jr. | ........ C09D 175/04 428/142 |
| 8,703,844 | B2 * | 4/2014 | Burckhardt | ........ C08G 59/4042 523/400 |
| 2013/0164548 | A1 * | 6/2013 | Tasaka | ..................... C09D 4/06 428/451 |
| 2016/0244367 | A1 * | 8/2016 | Gimeno Santos | ...... C04B 26/06 |

FOREIGN PATENT DOCUMENTS

| | | |
|---|---|---|
| JP | 2008115581 A * | 5/2008 |
| KR | 10-1997-0059246 A | 8/1997 |
| KR | 10-2009-0063928 A | 6/2009 |
| KR | 10-2012-0100185 A | 9/2012 |
| KR | 10-2015-0111783 A | 10/2015 |
| KR | 10-1674648 B1 | 11/2016 |
| KR | 10-1700241 B1 | 1/2017 |
| KR | 10-1725288 B1 | 4/2017 |

OTHER PUBLICATIONS

English abstract of JP 63315757A, Dec. 23, 1988, Japan, 3 pages.*

* cited by examiner

*Primary Examiner* — Tae H Yoon
(74) *Attorney, Agent, or Firm* — Novick, Kim & Lee, PLLC; Jae Youn Kim

(57) ABSTRACT

A floor coating agent with excellent adhesion and hardness, and a construction method using the same are proposed. The floor coating agent includes a primer layer applied onto a surface of floor and then cured, and a floor coating layer applied onto the primer layer and then cured, wherein the primer layer is produced from a mixture of a self-emulsified epoxy resin, an acrylic polyol resin, a defoaming agent, 1,3,5-triglycidyl isocyanurate, dodecanedioic acid, anhydrous sodium citrate and water, and the floor coating layer is produced from a floor coating layer composition including an acidic copolymer alkyl ammonium salt, zinc oxide, oxalic acid, ammonium hydroxide and distilled water. Based on this configuration, floor coating agent can improve durability, abrasion resistance, gloss and the like of a floor surface, based on excellent adhesion to the floor surface and superior surface hardness.

1 Claim, No Drawings

FLOOR COATING AGENT HAVING EXCELLENT SURFACE ADHESION AND HARDNESS, AND CONSTRUCTION METHOD USING THE SAME

CROSS-REFERENCE TO RELATED APPLICATION

This application claims to and benefit of Korean Patent Application 10-2017-0183733, filed Dec. 29, 2017, the disclosure of which is incorporated by reference herein in its entirety.

BACKGROUND OF THE INVENTION

Field of the Invention

The present invention relates to a floor coating agent with excellent adhesion and hardness, and a construction method using the same and more particularly, to a floor coating agent with excellent adhesion and hardness which can improve durability, abrasion resistance, gloss and the like of a floor surface due to excellent adhesion to the floor surface and superior surface hardness, and a construction method using the same.

Description of the Related Art

Recent development of coating agents for domestic and overseas flooring focuses on high-performance and highly functional coating agents having various uses and characteristics in consideration of the environment. Among these coatings, some water-based coatings have been used indoors due to poor physical properties. However, the use of water-based coatings has been gradually increasing due to regulations put into effect in the coating and paint industry due to strengthened environmental laws.

However, water-based coatings are greatly affected by climatic conditions during film formation and thus have poor drying properties, since water used for water-based coatings has a large surface tension and a high latent heat of evaporation. In addition, water-based coatings have lower distinctness and contamination resistance than oil-based coatings and contain a hydrophilic ingredient such as a carboxyl group or polyethylene oxide in its structure, thus entailing neutralization of such an ingredient. Accordingly, a neutralized salt of this substance remains on the film, thus causing problems of deterioration in water resistance, alkali resistance and weather resistance.

Meanwhile, tiles are widely used as finishing materials for indoor and outdoor ceilings, floors and walls, and as decorative materials with various patterns due to excellent durability, water resistance and abrasion resistance.

Generally, tiles are commonly used in business places such as kitchens, toilets, verandas, bathrooms, saunas, steam rooms, and the like requiring hygienic environments owing to the characteristics described above. Such tiles are produced from various kinds of materials such as marble, polyvinyl chloride, porcelain, pottery, synthetic resins, glass, etc., depending on used materials or applications.

However, conventional floor coating agents used for tiles made of polyvinyl chloride (PVC) resins or the like which use the wax itself as a coating agent are generally applied several times. The floor coating agents used for tiles require a long coating time and have a problem of high reconstruction rate due to difficulty in obtaining desired brightness or hardness, thus disadvantageously causing an increased process cost.

In addition, floor coating agents applied to conventional tiles are readily peeled off within a short period of time, resulting in deterioration in durability and being vulnerable to stains and abrasion. In addition, when the coating surface of the floor is cleaned through friction using a pad or the like, there is a problem of requiring frequent re-coating.

PRIOR ART

Patent Document (Patent Document 01) Korean Patent No. 10-1674648 (registered on Nov. 3, 2016)
(Patent Document 02) Korean Patent Laid-open No. 10-2012-0100185 (published on Sep. 12, 2012)
(Patent Document 03) Korean Patent No. 10-1725288 (registered on Apr. 4, 2017)

SUMMARY OF THE INVENTION

Therefore, the present invention has been made in view of the above problems, and it is one object of the present invention to provide a floor coating agent with excellent adhesion and hardness which can improve durability, abrasion resistance, gloss and the like of the floor surface due to excellent adhesion to the floor surface and superior surface hardness, and a construction method using the same.

It is another object of the present invention to provide a floor coating agent with excellent adhesion and hardness which can improve corrosion resistance, chemical resistance and excellent weatherability by reinforcing the floor surface and forming a chemically stable film, and a construction method using the same.

Other aspects of the present invention are not limited to those described above and other aspects not disclosed herein will be clearly understood by those skilled in the art.

In accordance with the present invention, the above and other objects can be accomplished by the provision of a floor coating agent with excellent adhesion and hardness including a primer layer applied onto the surface of a floor and then cured, and a floor coating layer applied onto the primer layer and then cured, wherein the primer layer is produced from a mixture of a self-emulsified epoxy resin, an acrylic polyol resin, a defoaming agent, 1,3,5-triglycidyl isocyanurate, dodecanedioic acid, anhydrous sodium citrate and water, and the floor coating layer is produced from a floor coating layer composition including an acidic copolymer alkyl ammonium salt, zinc oxide, oxalic acid, ammonium hydroxide and distilled water.

The primer layer may include, on a weight basis, 30 to 50 parts by weight of the self-emulsified epoxy resin, 10 to 20 parts by weight of the acrylic polyol resin, 1 to 3 parts by weight of the defoaming agent, 3 to 7 parts by weight of the 1,3,5-triglycidyl isocyanurate, 5 to 10 parts by weight of the dodecanedioic acid, 1 to 5 parts by weight of the anhydrous sodium citrate, 0.5 to 2 parts by weight of an antifreeze and 10 to 40 parts by weight of water, and the floor coating layer may include, on a weight basis, 0.1 to 0.3 parts by weight of the acidic copolymer alkyl ammonium salt, 0.5 to 1.0 part by weight of zinc oxide, 1 to 5 parts by weight of oxalic acid, 2 to 3 parts by weight of ammonium hydroxide and 90 to 100 parts by weight of distilled water.

The floor coating agent may further include an additive, in addition to the floor coating layer composition, wherein the additive is used in a weight ratio of 5 to 15 parts by weight, with respect to the total 100 parts by weight of the floor coating layer composition, and the additive includes, on a weight basis, 1 to 2 parts by weight of an antioxidant, 0.5 to 1 part by weight of a light stabilizer, 0.1 to 0.5 parts by weight of a film former, 0.1 to 0.5 parts by weight of a rust inhibitor, 1 to 3 parts by weight of activated carbon and 0.1 to 0.5 parts by weight of an insecticide.

In accordance with another aspect of the present invention, there is provided a construction method using a floor coating agent with excellent adhesion and hardness including forming a primer layer on a surface of floor, and drying the primer layer and then forming a floor coating layer on the primer layer, wherein the primer layer is produced by mixing a self-emulsified epoxy resin, an acrylic polyol resin, a defoaming agent, 1,3,5-triglycidyl isocyanurate, dodecanedioic acid, anhydrous sodium citrate and water, the floor coating layer is produced from a floor coating layer composition including an acidic copolymer alkyl ammonium salt, zinc oxide, oxalic acid, ammonium hydroxide and distilled water, the primer layer includes, on a weight basis, 30 to 50 parts by weight of the self-emulsified epoxy resin, 10 to 20 parts by weight of the acrylic polyol resin, 1 to 3 parts by weight of the defoaming agent, 3 to 7 parts by weight of the 1,3,5-triglycidyl isocyanurate, 5 to 10 parts by weight of the dodecanedioic acid, 1 to 5 parts by weight of the anhydrous sodium citrate, 0.5 to 2 parts by weight of an antifreeze and 10 to 40 parts by weight of the water, the floor coating layer includes, on a weight basis, 0.1 to 0.3 parts by weight of the acidic copolymer alkyl ammonium salt, 0.5 to 1.0 part by weight of the zinc oxide, 1 to 5 parts by weight of the oxalic acid, 2 to 3 parts by weight of the ammonium hydroxide and 90 to 100 parts by weight of the distilled water, wherein the floor coating agent further includes an additive, in addition to the floor coating layer composition, wherein the additive is used in a weight ratio of 5 to 15 parts by weight, with respect to the total 100 parts by weight of the floor coating layer composition, and the additive includes, on a weight basis, 1 to 2 parts by weight of an antioxidant, 0.5 to 1 part by weight of a light stabilizer, 0.1 to 0.5 parts by weight of a film former, 0.1 to 0.5 parts by weight of a rust inhibitor, 1 to 3 parts by weight of activated carbon and 0.1 to 0.5 parts by weight of an insecticide.

Other details of embodiments are incorporated in the Detailed Description of the Invention.

DETAILED DESCRIPTION OF THE INVENTION

The advantages and features of the present invention as well as methods to accomplish the same will be clearly understood from the following embodiments described in detail. However, the present invention is not limited to the embodiments described herein and will be embodied in different forms. The embodiments are suggested only to offer thorough and complete understanding of the disclosed context and sufficiently inform those skilled in the art of the technical concept of the present invention.

The terms used herein are used only for illustration of certain embodiments and are not limited to the present invention. Singular forms are intended to include plural forms as well, unless context clearly indicates otherwise.

Unless differently defined, all terms used herein including technical or scientific terms have the same meanings as generally understood by those skilled in the art to which the present invention pertains. Terms identical to those defined in generally used dictionaries should be interpreted as having meanings identical to contextual meanings of the related art, and are not interpreted as having ideal or excessively formal meanings unless they are definitely defined in the present specification.

Hereinafter, the floor coating agent with excellent adhesion and hardness according to the present invention will be described in more detail.

The floor coating agent according to the present invention includes a primer layer applied onto a floor surface and then cured, and a floor coating layer applied onto the primer layer and then cured.

The primer layer is formed after application to the surface of a floor made of tile, concrete or the like, and curing. The primer layer permeates into fine cracks or voids of the surface of a floor made of tile, concrete or the like and is then cured into a net-shaped film, thereby strengthening the surface of the floor and fundamentally preventing moisture ($H_2O$) or various gases causing corrosion (for example, $O_2$, $CO_2$, $NO_x$, $SO_x$ or the like) from permeating the surface of the floor made of tile, concrete or the like.

The primer layer according to the present invention can be prepared by injecting a self-emulsified epoxy resin, an acrylic polyol resin, a defoaming agent, 1,3,5-triglycidyl isocyanurate, dodecanedioic acid, anhydrous sodium citrate and water into a mix tank and homogeneously mixing the same.

In addition, the primer layer according to the present invention includes, on a weight basis, 30 to 50 parts by weight of a self-emulsified epoxy resin, 10 to 20 parts by weight of an acrylic polyol resin, 1 to 3 parts by weight of a defoaming agent, 3 to 7 parts by weight of 1,3,5-triglycidyl isocyanurate, 5 to 10 parts by weight of dodecanedioic acid, 1 to 5 parts by weight of anhydrous sodium citrate, 0.5 to 2 parts by weight of an antifreeze and 10 to 40 parts by weight of water.

The self-emulsified epoxy resin is an epoxy resin which has an active group enabling self-emulsification. The self-emulsified epoxy resin used in the present invention may be a self-emulsified modified epoxy resin which has an epoxy equivalent weight of 170 to 190 g/eq.

In general, the water-soluble epoxy resin requires a great amount of emulsifier, that is, surfactant during emulsification, thus causing deterioration in physical properties such as strength, weatherability, water resistance and the like of films. The present invention utilizes the self-emulsified modified epoxy resin, thereby significantly improving physical properties such as strength, weatherability, water resistance and the like of films.

The acrylic polyol resin is a water-soluble resin having a hydroxyl functional group (—OH), which is mixed and reacts with a curing agent and permeates into fine cracks or voids of the surface of the floor made of tile, concrete or the like and is then cured to form a net-shaped film.

The acrylic polyol resin according to the present invention contains a hydroxyl group. For example, the acrylic polyol resin can be prepared as a water-soluble form by reacting, on a weight basis, 65 to 85 parts by weight of water, 1 to 3 parts by weight of a polymerization initiator, 15 to 25 parts by weight of an acrylic monomer containing a hydroxyl group, 3 to 5 parts by weight of an acrylic monomer containing a carboxyl group, and 10 to 20 parts by weight of an amide-based acrylic monomer.

The acrylic monomer containing a hydroxyl group used to prepare the acrylic polyol resin may be any one selected from 2-hydroxyacrylate and 2-hydroxyethylacrylate, the acrylic monomer having a carboxyl group may be any one selected from acrylic acid or maleic acid, and the amide-based acrylic monomer may be any one selected from acrylic amide and diacetone acrylic amide.

The polymerization initiator may be any one selected from benzoyl peroxide or potassium persulfate. The defoaming agent is added to prevent foaming and may include one or more selected from the group consisting of acrylate polyamine, sodium octyl phosphate and aluminium stearate.

The 1,3,5-triglycidyl isocyanurate and dodecanedioic acid are used as curing agents and dodecanedioic acid having a molecular weight of 230 to 280 prepared from a crystalline C9 to C12 dibasic acid with a purity of 99% or more is used as the dodecanedioic acid, so that superior physical properties such as adhesive strength, flexibility, chemical resistance, corrosion resistance as well as excellent mechanical properties can be secured through reaction with the polyester resin.

In addition, the 1,3,5-triglycidyl isocyanurate is used in combination with dodecanedioic acid, to induce curing reaction with the resin and thereby secure mechanical and chemical properties as well as gloss and transparency of films to which the floor coating agent according to the present invention is applied.

In addition, the 1,3,5-triglycidyl isocyanurate according to the present invention preferably has a glass transition temperature (Tg) of −20° C. or less and a number average molecular weight (Mn) within the range of 800 to 1,200.

The anhydrous sodium citrate is used to maintain phase stability by dispersing compositions contained in the floor coating agent and function as an anionic surfactant to stabilize the compositions.

The antifreeze is used to secure low-temperature stability, for example, to prevent deterioration in physical properties, even when construction is conducted on the surface of the floor such as tile or concrete at a low temperature such as in winter. For example, the antifreeze may be any one selected from ethylene glycol and propylene glycol.

The floor coating layer is formed by application to the primer layer and then curing. The floor coating layer according to the present invention is prepared from raw materials including a floor coating layer composition including an acidic copolymer alkyl ammonium salt, zinc oxide, oxalic acid, ammonium hydroxide and distilled water and may further include at least one additive to impart a variety of functions. The additive includes an antioxidant, a light stabilizer, a film former, a rust inhibitor, activated carbon and an insecticide.

In addition, the floor coating layer used in the present invention may be formed using the floor coating layer composition which, on a weight ratio, includes 0.1 to 0.3 parts by weight of the acidic copolymer alkyl ammonium salt, 0.5 to 1.0 part by weight of zinc oxide, 1 to 5 parts by weight of oxalic acid, 2 to 3 parts by weight of ammonium hydroxide and 90 to 100 parts by weight of distilled water, and the additive, which is used in a weight ratio of 5 to 15 parts by weight, with respect to the total 100 parts by weight of the floor coating layer composition.

In addition, the additive according to the present invention may include, on a weight ratio, 1 to 2 parts by weight of an antioxidant, 0.5 to 1 part by weight of a light stabilizer, 0.1 to 0.5 parts by weight of a film former, 0.1 to 0.5 parts by weight of a rust inhibitor, 1 to 3 parts by weight of activated carbon and 0.1 to 0.5 parts by weight of an insecticide.

The zinc oxide is a white pigment which may serve as a catalyst. The zinc oxide used in the present invention can improve flexibility of the thin coating layer formed by the floor coating agent and adhesion to the primer layer.

The oxalic acid neutralizes the floor coating agent prepared from raw materials including distilled water, thereby securing work stability. The oxalic acid is harmless to humans and serves as a hydrolysis catalyst.

The ammonium hydroxide is used as an isoelectric point regulator to control the isoelectric point and is used to secure the stability of the floor coating layer composition.

The distilled water is a solvent to dissolve the floor coating agent composition, the solvent may be any one selected from water, distilled water and deionized water, which are commonly used in the art. In the present invention, preferably, the solvent is distilled water.

In addition, the antioxidant used as the additive may be tetrakis[methylene-3-(dodecylthio)propionate]-methane) and the light stabilizer may be bis(1,2,2,6,6-pentamethyl-4-piperidinyl)-2-butyl-2-(4-hydroxy-3,5-di-tert-butylbenzyl) propanedioate.

The antioxidant and light stabilizer used in the present invention are contained in the floor coating layer composition, to block UV and inhibit radical decomposition of cured films and thereby prevent corrosion of film environments and application defects.

The film former is used to further improve storage stability of the floor coating layer composition and enhance a minimum film formation temperature (MFFT) to obtain a uniform film. For example, the film former may be 2,2,4-trimethyl-1,3-pentanediol monoisobutyrate.

The rust inhibitor is added to prevent generation of blisters in films produced using a floor coating agent when allowed to stand under wet environments for a long period of time and to improve storage properties. The rust inhibitor used in the present invention may be butanedioic acid. The rust inhibitor has effects of improving adhesive strength and corrosion resistance.

The activated carbon is a carbon cluster with grown fine pores, which can modify an inner surface area by activation and has excellent water absorption and adhesion through the carbon atom functional group present therein.

The activated carbon of the present invention has an effect of eliminating the adsorption of harmful materials and slowly releases moisture absorbed during the drying process after applying a powder coating composition to the surfaces of structures, to lengthen a drying time and thereby prevent cracks derived from rapid drying.

In addition, the activated carbon according to the present invention has a hardness of 90 mass fraction % or more, a packing density of 0.50 to 0.55 g/ml, a specific surface area of 1,000 to 1,200 m$^2$/g, a pore diameter of 5 Å to 10 Å regarding the pore distribution, an iodine adsorption of 900 mg/g or more, a pore volume of 0.50 ml/g, a pH of 8 to 9, a phenol adsorption of 19 ml/g, and an MB decolorization of 160 to 200 ml/g.

The insecticide is used to prevent permeation of pests, insects or the like, and the insecticide used in the present invention may be at least one organophosphorus insecticide selected from the group consisting of dichlorvos, chlorpyrifos, diazinon and propetamphos.

Hereinafter, a construction method using the floor coating agent with excellent adhesion and hardness according to the present invention will be described in more detail.

First, a primer layer is formed on the surface of a floor made of tile, concrete or the like.

The primer layer permeates into fine cracks or voids in the surface of the floor made of tile, concrete or the like and is then cured into a net-shaped film, thereby strengthening the surface of the floor and fundamentally preventing moisture ($H_2O$) or various gases causing corrosion (for example, $O_2$, $CO_2$, $NO_x$, $SO_x$ or the like) from permeating the surface of the floor made of tile, concrete or the like.

The primer layer according to the present invention can be produced by injecting a self-emulsified epoxy resin, an acrylic polyol resin, a defoaming agent, 1,3,5-triglycidyl isocyanurate, dodecanedioic acid, anhydrous sodium citrate and water into a mix tank and homogeneously mixing the ingredients.

In addition, the primer layer according to the present invention may include, on a weight basis, 30 to 50 parts by weight of a self-emulsified epoxy resin, 10 to 20 parts by weight of an acrylic polyol resin, 1 to 3 parts by weight of a defoaming agent, 3 to 7 parts by weight of 1,3,5-triglycidyl isocyanurate, 5 to 10 parts by weight of dodecanedioic acid, 1 to 5 parts by weight of anhydrous sodium citrate, 0.5 to 2 parts by weight of an antifreeze and 10 to 40 parts by weight of water.

Then, the primer layer is dried and a floor coating layer is then formed on the primer layer.

The floor coating layer is formed by applying raw materials onto the primer layer and then curing. The floor coating layer according to the present invention is prepared from raw materials including a floor coating layer composition including an acidic copolymer alkyl ammonium salt, zinc oxide, oxalic acid, ammonium hydroxide and distilled water, and may further include at least one additive to impart a variety of functions. The additive may further include an antioxidant, a light stabilizer, a film former, a rust inhibitor, activated carbon and an insecticide.

In addition, the floor coating layer used in the present invention may be formed using the floor coating layer composition which, on a weight ratio, includes 0.1 to 0.3 parts by weight of the acidic copolymer alkyl ammonium salt, 0.5 to 1.0 part by weight of zinc oxide, 1 to 5 parts by weight of oxalic acid, 2 to 3 parts by weight of ammonium hydroxide and 90 to 100 parts by weight of distilled water, as well as the additive, which is used in a weight ratio of 5 to 15 parts by weight, with respect to the total 100 parts by weight of the floor coating layer composition.

Hereinafter, embodiments of the floor coating agent with excellent adhesion and hardness according to the present invention will be described in more detail.

Example

First, a primer layer was formed on the floor by the aforementioned method and then cured, and a floor coating layer was then formed on the primer layer.

At this time, the primer layer included, on a weight basis, 40 parts by weight of a self-emulsified epoxy resin, 15 parts by weight of an acrylic polyol resin, 2 parts by weight of a defoaming agent, 5 parts by weight of 1,3,5-triglycidyl isocyanurate, 7 parts by weight of dodecanedioic acid, 3 parts by weight of anhydrous sodium citrate, 1 part by weight of an antifreeze and 30 parts by weight of water.

In addition, the floor coating layer included, on a weight basis, 0.2 parts by weight of an acidic copolymer alkyl ammonium salt, 0.8 parts by weight of zinc oxide, 3 parts by weight of oxalic acid, 2.5 parts by weight of ammonium hydroxide and 93 parts by weight of distilled water, and the additive was added in an amount of 10 parts by weight, with respect to the total 100 parts by weight of the floor coating layer composition.

At this time, the additive included, on a weight basis, 1.5 parts by weight of an antioxidant, 0.8 parts by weight of a light stabilizer, 0.3 parts by weight of a film former, 0.3 parts by weight of a rust inhibitor, 2 parts by weight of activated carbon and 0.3 parts by weight of an insecticide.

<Abrasion Resistance>

Measurement of abrasion resistance in accordance with ASTM D 3389

<Optical Transmittance>

Average transmittance of light with a wavelength of 350 to 700 nm measured using UV spectrometer <Pencil Hardness>

Pencil hardness was measured in accordance with ASTM D 3363

<Surface Smoothness>

Observation of appearance regarding film smoothness after curing.

○: considerably smooth surface comparable to mirror surface

Δ: surface with slight roughness x: surface with many wrinkles

Results measured by the test method are shown in the following Table 1.

TABLE 1

| Item | Test Example |
|---|---|
| Abrasion resistance (g) | <0.85 |
| Optical transmittance (%) | 81 |
| Pencil hardness | 4H |
| Surface smoothness | O |

As can be seen from Table 1, the floor coating agent according to Example has an abrasion resistance of less than 0.85, an optical transmittance of 81%, excellent pencil hardness of 4H and superior surface smoothness comparable to mirror surface.

<Adhesion Test>

The adhesion test was conducted in accordance with KSF 2761, as an adhesive strength test method of adhesives for concrete, by applying a floor coating agent onto the surface of asphalt, curing the surface at 20° C. for 7 days, digging a groove with a core picker with a diameter of 10 cm, adhering an adhesive substrate to the upper surface of the floor coating agent, and measuring adhesive strength using a hydraulic tensile tester.

<Measurement of Slip Resistance>

Slip (skid) resistance was measured in accordance with the slip resistance test method of KSF 2375, testing was conducted on a specimen continuously four times using a British pendulum tester (BPT) after water was sufficiently sprayed onto the specimen to form a water film, and results were recorded. At this time, water was sprayed in each test and whether or not a contact length (125±1.6 mm) was changed was checked. An average of British pendulum number (BPN) values measured four times in each spot was determined as BPN.

Here, BPN is a value normalized from skid friction resistance using BPT. BPN is proportional to frictional strength (coefficient of friction).

Results measured by the test method are shown in the following Table 2.

TABLE 2

| Item | Example |
|---|---|
| Adhesive strength (kgf/cm$^2$) | 19.8 |
| Slip resistance (BPN) | 82 |

In consideration of workability, the floor coating agent according to the present invention has an adhesive strength of 12 kgf/cm² or more and a slip resistance of 67 BPN of more, which indicates that the floor coating agent according to the present invention has good physical properties.

As can be seen from Table 2, the floor coating agent according to the present invention exhibits adhesive strength (kgf/cm²) of 19.8 and a slip resistance (BPN) of 82, indicating that the floor coating agent exhibits both excellent adhesive strength and slip resistance.

<Cracks and Surface Non-Slip State>

Surface cracks and surface non-slip state of the floor coating agent produced in Example were checked, and results are shown in the following Table 3.

TABLE 3

|  | Crack (5° C.) | Surface non-slip state |
| --- | --- | --- |
| Example | X | Good |

Whether or not cracks occurred and surface non-slip state were observed by the naked eye.

As can be seen from Table 3, the floor coating agent according to the present invention did not crack during curing and exhibited excellent surface non-slip state.

As apparent from the foregoing, the floor coating agent according to the present invention can improve durability, abrasion resistance, gloss and the like of a floor surface owing to excellent adhesion to the floor surface and superior surface hardness.

In addition, the floor coating agent according to the present invention can improve properties such as corrosion resistance, chemical resistance, excellent weatherability and the like by reinforcing the floor surface and forming a chemically stable film.

It will be sufficiently understood that the embodiments of the present invention provide a variety of effects not described in detail.

Although the preferred embodiments of the present invention have been disclosed for illustrative purposes, those skilled in the art will appropriate that various modifications, additions and substitutions are possible, without departing from the scope and spirit of the invention as disclosed in the accompanying claims. Accordingly, it should be understood that the embodiments described above are merely used for illustrating the present invention, rather than limiting the scope of the present invention.

What is claimed is:

1. A construction method using a floor coating agent with excellent adhesion and hardness, the method comprising:
    forming a primer layer on a surface of floor; and
    drying the primer layer and then forming a floor coating layer on the primer layer,
    wherein the primer layer is produced by mixing a self-emulsified epoxy resin, an acrylic polyol resin, a defoaming agent, 1,3,5-triglycidyl isocyanurate, dodecanedioic acid, anhydrous sodium citrate an antifreeze and water,
    the floor coating layer is produced from a floor coating layer composition comprising an acidic copolymer alkyl ammonium salt, zinc oxide, oxalic acid, ammonium hydroxide and distilled water,
    the primer layer comprises, on a weight basis, 30 to 50 parts by weight of the self-emulsified epoxy resin, 10 to 20 parts by weight of the acrylic polyol resin, 1 to 3 parts by weight of the defoaming agent, 3 to 7 parts by weight of the 1,3,5-triglycidyl isocyanurate, 5 to 10 parts by weight of the dodecanedioic acid, 1 to 5 parts by weight of the anhydrous sodium citrate, 0.5 to 2 parts by weight of the antifreeze and 10 to 40 parts by weight of the water,
    the floor coating layer comprises, on a weight basis, 0.1 to 0.3 parts by weight of the acidic copolymer alkyl ammonium salt, 0.5 to 1.0 part by weight of the zinc oxide, 1 to 5 parts by weight of the oxalic acid, 2 to 3 parts by weight of the ammonium hydroxide and 90 to 100 parts by weight of the distilled water,
    wherein the floor coating agent further comprises an additive, in addition to the floor coating layer composition,
    wherein the additive is used in a weight ratio of 5 to 15 parts by weight, with respect to the total 100 parts by weight of the floor coating layer composition, and
    the additive comprises, on a weight basis, 1 to 2 parts by weight of an antioxidant, 0.5 to 1 part by weight of a light stabilizer, 0.1 to 0.5 parts by weight of a film former, 0.1 to 0.5 parts by weight of a rust inhibitor, 1 to 3 parts by weight of activated carbon and 0.1 to 0.5 parts by weight of an insecticide.

\* \* \* \* \*